(12) United States Patent
Yang et al.

(10) Patent No.: US 9,509,224 B2
(45) Date of Patent: Nov. 29, 2016

(54) METHOD FOR CONTROLLING SYNCHRONOUS RECTIFIER OF POWER CONVERTER AND CONTROL CIRCUIT USING THE SAME

(71) Applicant: SYSTEM GENERAL CORP., Taipei (TW)

(72) Inventors: Ta-Yung Yang, Milpitas, CA (US);
Chou-Sheng Wang, Keelung (TW);
Tse-Jen Tseng, Taichung (TW)

(73) Assignee: Fairchild (Taiwan) Corporation, Taipei (TW)

( * ) Notice: Subject to any disclaimer, the term of this patent is extended or adjusted under 35 U.S.C. 154(b) by 0 days.

(21) Appl. No.: 14/460,373

(22) Filed: Aug. 15, 2014

(65) Prior Publication Data

US 2015/0049523 A1   Feb. 19, 2015

Related U.S. Application Data

(60) Provisional application No. 61/866,565, filed on Aug. 16, 2013.

(51) Int. Cl.
*H02M 3/335* (2006.01)
*H02M 1/00* (2006.01)

(52) U.S. Cl.
CPC . *H02M 3/33592* (2013.01); *H02M 2001/0048* (2013.01); *Y02B 70/1475* (2013.01); *Y02B 70/1491* (2013.01)

(58) Field of Classification Search
CPC ........... H02M 3/335; H02M 3/33592; H02M 2001/0032; Y02B 70/126; Y02B 70/143
USPC .............................. 363/21.01–21.18, 89, 127
See application file for complete search history.

(56) References Cited

U.S. PATENT DOCUMENTS

| | | | | |
|---|---|---|---|---|
| 7,310,251 B2* | 12/2007 | Yang | ...................... | H02H 7/1222 363/21.12 |
| 7,440,298 B2* | 10/2008 | Yang | .................. | H02M 3/33592 363/127 |
| 7,812,580 B2* | 10/2010 | Watanabe | ........... | H02M 3/1588 323/268 |
| 8,023,289 B2 | 9/2011 | Yang et al. | | |
| 8,416,587 B2* | 4/2013 | Chen | .................. | H02M 3/33592 363/127 |
| 2007/0201252 A1 | 8/2007 | Yang et al. | | |
| 2009/0003019 A1 | 1/2009 | Yang | | |

FOREIGN PATENT DOCUMENTS

CN  101692596  7/2012

OTHER PUBLICATIONS

"Office Action of Taiwan Counterpart Application," issued on Mar. 11, 2016, p. 1-p. 10.

* cited by examiner

*Primary Examiner* — Yemane Mehari
(74) *Attorney, Agent, or Firm* — Jianq Chyun IP Office

(57) ABSTRACT

The invention discloses a method for controlling a synchronous rectifier of a power converter and a control circuit using the same. The method includes the following steps. A control signal is generated to control a synchronous rectification transistor in response to an on-time of a switching signal, a level of a transformer voltage and an output voltage of the power converter. The switching signal is used for switching a transformer. The control signal is generated once the switching signal is turned off. A transformer signal is related to an input voltage of the power converter. The control signal is generated when the on-time of the switching signal is longer than a first time threshold.

10 Claims, 6 Drawing Sheets

US 9,509,224 B2

METHOD FOR CONTROLLING SYNCHRONOUS RECTIFIER OF POWER CONVERTER AND CONTROL CIRCUIT USING THE SAME

CROSS REFERENCE TO RELATED APPLICATION

This application claims the priority benefits of U.S. provisional application Ser. No. 61/866,565, filed on Aug. 16, 2013. The entirety of the above-mentioned patent applications is hereby incorporated by reference herein and made a part of this specification.

BACKGROUND

Field of the Invention

The present invention relates to a method for controlling a synchronous rectifier of a power converter and a control circuit using the same, and more particularly relates to a method for controlling a synchronous rectifier of a power converter and a control circuit using the same which provides the complete protection function for preventing the incorrect turn-on of synchronous rectifier.

Description of Related Art

Off-line power converter (offline power converter) includes a power transformer (power transformer), to comply with safety regulations, the power transformer provides an AC input to the power converter output isolation between. In a recent development, the application of the power transformer secondary synchronous rectifiers in order to achieve a high power conversion efficiency of the converter.

However, the synchronous rectifier of power converter may be accidentally, or incorrectly turned on, which may bring negative effects to the power converter, such as low efficiency of power conversion, etc.

SUMMARY

The present invention provides a method for controlling a synchronous rectifier of a power converter. The method includes the following steps: generating a control signal for a synchronous rectification transistor responding to an on-time of a switching signal, a level of a transformer voltage and an output voltage of the power converter, and the switching signal is used for switching a transformer, and the control signal is generated once the switching signal is turned off. A transformer signal is related to an input voltage of the power converter. The control signal is generated when the on-time of the switching signal is longer than a first time threshold.

The present invention provides a method for the controlling a synchronous rectifier of a power converter. The method includes the following steps. A control signal is generated to control a synchronous rectification transistor according to a switching signal. The control signal is shortened when an input voltage of the power converter is lower than a low-voltage threshold. The low-voltage threshold is related to an output voltage of the power converter. The switching signal is used for switching a transformer. The control signal is generated once the switching signal is turned off. The control signal is generated when the on-time of the switching signal is longer than a first time threshold.

From another point of view, the present invention provides a control circuit for controlling a synchronous rectifier of a power converter. The control circuit includes a controller and a protection circuit. The controller generates a control signal to control a synchronous rectification transistor in response to an on-time of a switching signal, a transformer voltage and an output voltage of the power converter. The protection circuit generates a protection signal in response to the transformer voltage and the output voltage. The switching signal is used for switching a transformer. The control signal is generated once the switching signal is turned off. The transformer signal is related to an input voltage of the power converter. The control signal is generated when an on-time of the switching signal is longer than a first time threshold. The control signal can be generated when the on-time of the switching signal is longer than a second time threshold if the protection signal is generated. The second time threshold is longer than the first time threshold.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
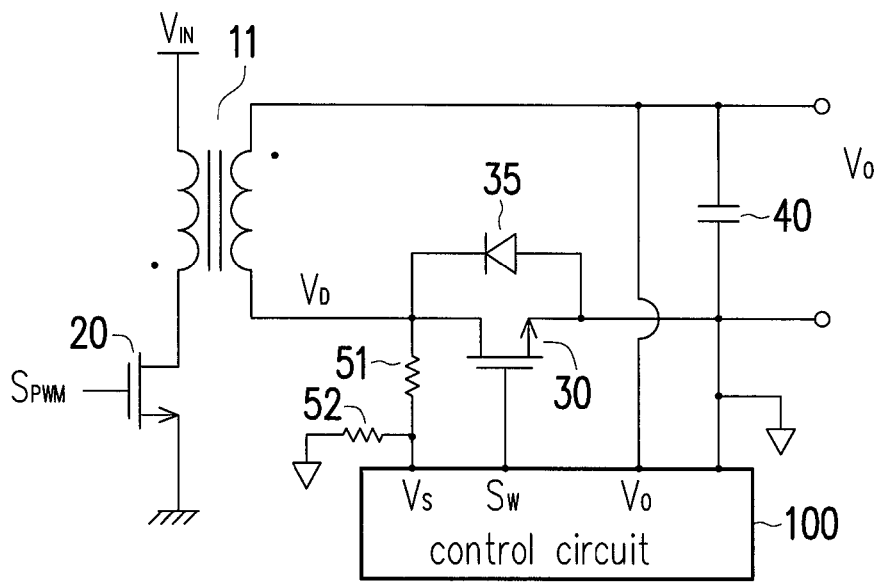
FIG. 1 shows a circuit diagram illustrating a power converter with a synchronous rectifier (SR) according to an embodiment of the present invention.

FIG. 1 shows a circuit diagram illustrating a power converter with a synchronous rectifier (SR) according to an embodiment of the present invention. A power converter 10 includes a transformer 11, a transistor 20 and 30, a diode 35, a capacitor 40, resistors 51 and 52 and a control circuit 100. The transformer 11 is connected to an input voltage $V_{IN}$ of the power converter 10. The transistor 20 is coupled to switch the primary winding $N_P$ of the transformer 11. A switching signal $S_{PWM}$ is coupled to drive the transistor 20 for regulating an output voltage $V_O$ of the power converter 10. When the transistor 20 is turned on, the energy will be stored into the transformer 11. Meanwhile, the transformer 11 will generate a voltage $V_D$ at the secondary winding $N_S$. When the transistor 20 is turned off, the energy stored in the transformer 11 will be delivered (demagnetized) to the secondary winding $N_S$ of the transformer 11, the output voltage $V_O$ will be generated through the diode 35 and the capacitor 40. The diode 35 could be the body diode of the transistor 30 or a rectifier parallel connected to the transistor 30. Once the diode 35 is turned on, the transistor 30 will be turned on immediately to reduce the power loss caused by the forward-voltage drop of the diode 35. The control circuit 100 is coupled to detect the output voltage $V_O$ and measure the voltage $V_D$ through resistors 51 and 52. The voltage $V_D$ generates a signal $V_S$ coupled to the control circuit 100 through the resistors 51 and 52. According to the output voltage $V_O$ and the voltage $V_D$, the control circuit 100 will generate a control signal $S_W$ to control the on/off of the transistor 30. The turn-on period of the transistor 30 should be related to the demagnetized time of the transformer 11. Therefore, the turn-on period $T_{SR}$ of the transistor 30 is controlled according to the equation (1), $$T_{SR} = \frac{V_D - V_O}{V_O} \times T_{ON}, \tag{1}$$

where $T_{ON}$ is the on-time of the switching signal $S_{PWM}$.

In order to accurately control the turn-on period $T_{SR}$ of the transistor 30, the control circuit 100 has to measure the output voltage $V_O$ and detect the level and period of the voltage $V_D$ for generating the control signal $S_W$. The level of the voltage $V_D$ is correlated to the level of the input voltage $V_{IN}$. The period of the voltage $V_D$ is equal to the on-time of the switching signal $S_{PWM}$.

Figure 2:
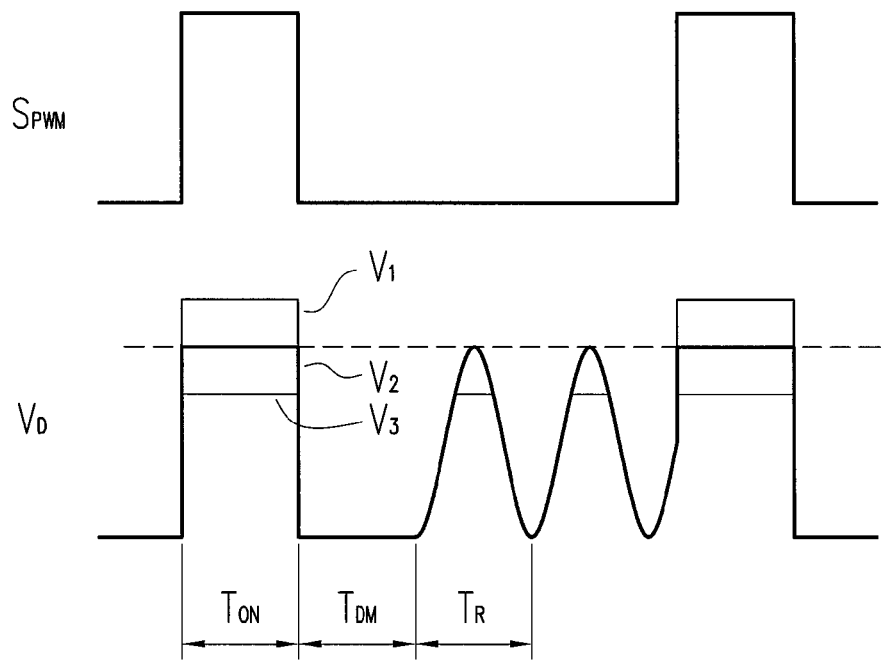
FIG. 2 shows waveforms of the switching signal $S_{PWM}$ and the voltage $V_D$ according to an embodiment of the present invention.

FIG. 2 shows waveforms of the switching signal $S_{PWM}$ and the voltage $V_D$ according to an embodiment of the present invention. A period $T_{DM}$ is the demagnetized time of the transformer 11. The turn-on period $T_{SR}$ of the transistor 30 should be equal to the period $T_{DM}$. If the transformer 11 operates in discontinuous current mode (DCM), a resonant ringing will happen after the transformer 11 is fully demagnetized (after the period of $T_{DM}$). A resonant period $T_R$ is determined by the resonant frequency in the primary side of the transformer 11. The resonant period $T_R$ is related to the inductance $L_P$ of the primary inductor of the transformer 11 and the capacitance $C_P$ of the parasitic capacitor the transistor 20.

$$T_R = 2\pi\sqrt{L_P \times C_P} \tag{2}$$

This resonant ringing may cause the error for the detection of the voltage $V_D$. The criteria for detecting a corrected voltage $V_D$ can be expressed as, $$V_D > (2 \times V_O) \tag{3}$$

When the transistor 20 is turned on, the level of the voltage $V_D$ is shown in the equation (4).

$$V_D = \left(\frac{N_S}{N_P} \times V_{IN}\right) + V_O \tag{4}$$

Figure 3:
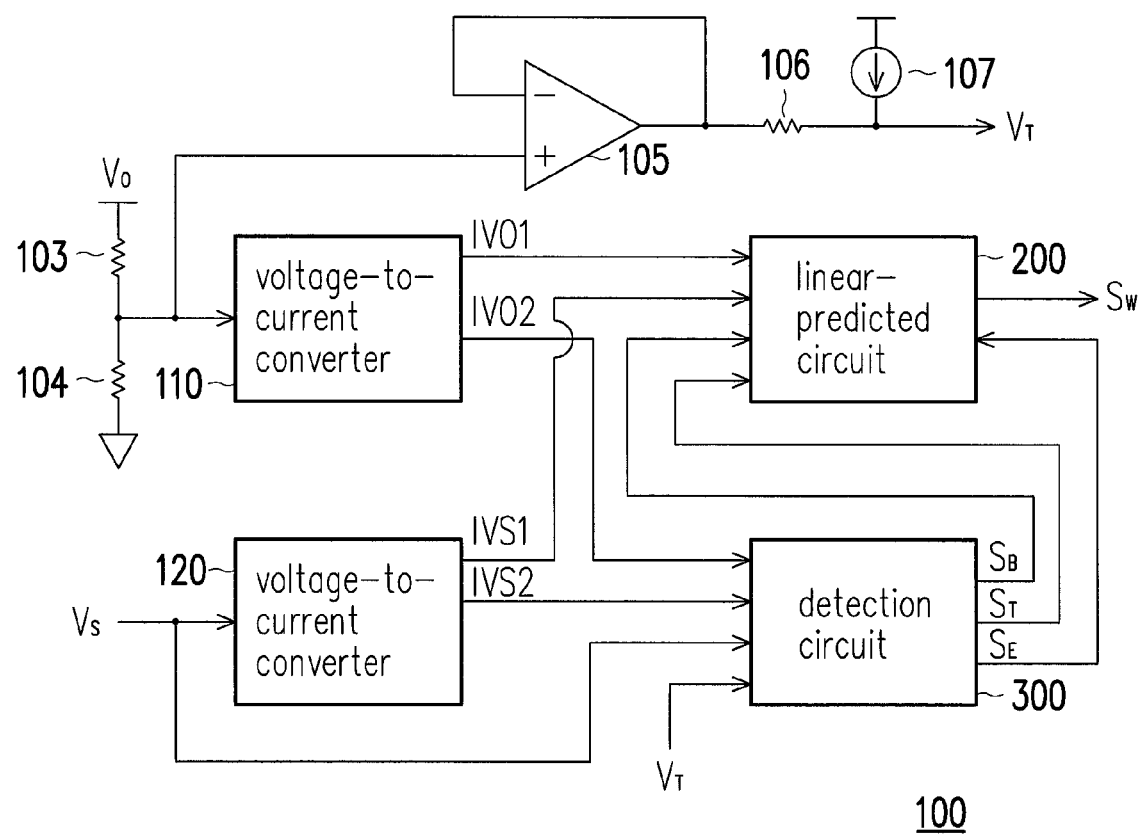
FIG. 3 shows a circuit diagram illustrating the control circuit according an embodiment of the present invention.

If the input voltage $V_{IN}$ is high, such as the voltage $V_1$ shown in FIG. 3, then the voltage $V_D$ can be detected correctly. If the input voltage $V_{IN}$ is decreased to $[(V_{IN} \times N_S/N_P) < V_O]$, such as the voltage $V_2$ and $V_3$ shown in FIG. 3, then the voltage $V_D$ could be incorrectly measured. The present invention provides the protection circuit to solve this problem.

FIG. 3 shows a circuit diagram illustrating the control circuit according an embodiment of the present invention. The control circuit 100 includes resistors 103, 104 and 106, a buffer 105, a current source 107, voltage-to-current converters 110 and 120, a linear-predicted circuit 200, and a detection circuit 300. The resistors 103 and 104 form a voltage divider for detecting the output voltage $V_O$ and generating a threshold $V_T$ through the buffer 105 and the resistor 106. The current source 107 associated with the resistor 106 provide a bias voltage to the threshold $V_T$. The level of the threshold voltage $V_T$ is used to regulate the value of the output voltage $V_O$. The voltage-to-current converter 110 is coupled to detect the output voltage $V_O$ through the resistors 103 and 104. Therefore, the voltage-to-current converter 110 generates current signals IVO1 and IVO2 proportional to the output voltage $V_O$. The voltage-to-current converter 120 is coupled to detect the signal $V_S$ that is related to the voltage $V_D$ and the input voltage $V_{IN}$. The voltage-to-current converter 120 generates current signals IVS1 and IVS2 proportional to the input voltage $V_{IN}$ and the voltage $V_D$.

The linear-predicted circuit 200 generates the control signal SW in accordance with the current signals IVO1 and IVS1. The detection circuit 300 is coupled to receive the current signals IVO2, IVS2, the signal VS and the threshold VT for generating an enable signal SE, a trigger signal ST and a protection signal $S_B$. The enable signal $S_E$, the trigger signal $S_T$ and the protection signal $S_B$ are coupled to control the linear-predicted circuit 200 for generating the control signal $S_W$.

The trigger signal $S_T$ will be generated once the signal $V_S$ is higher than the threshold $V_T$. The enable signal $S_E$ will be generated once a valid signal $S_A$ is enabled and the period of the trigger signal $S_T$ is longer than a time-threshold. The protection signal $S_B$ will be generated when the equation (3) is not satisfied.

Figure 4:
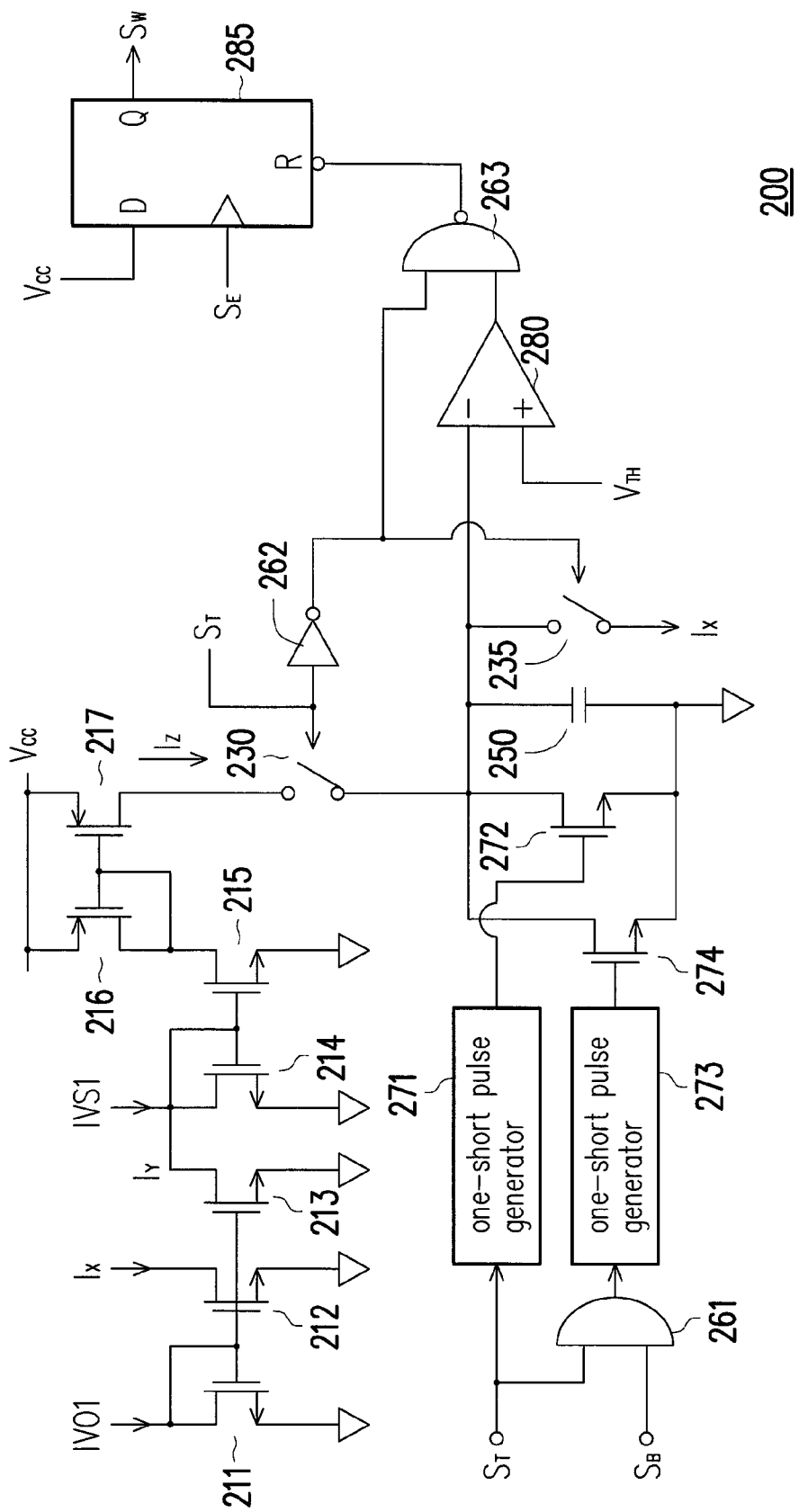
FIG. 4 shows a circuit diagram illustrating the linear-predicted circuit according to an embodiment of the present invention.

FIG. 4 shows a circuit diagram illustrating the linear-predicted circuit according to an embodiment of the present invention. The linear-predicted circuit 200 includes transistors 211-217, 272 and 274, switches 230 and 235, a capacitor 250, an AND gate 261, an inverter 262, a NAND gate 263, one-short pulse generators 271 and 273, a comparator 280, and a flip-flop 285. The transistors 211-213 develop a current mirror to generate current signals $I_X$ and $I_Y$ according to the current signal IVO1. The transistors 214-217 generate a current $I_Z$ in response to the current signal IVS1 and the current signal $I_Y$ to fulfill the term of "$V_D - V_O$" shown in the equation (1). The current signal $I_Z$ is coupled to charge the capacitor 250 through the switch 230. The current signal $I_X$ is coupled to discharge the capacitor 250 through the switch 235. The trigger signal $S_T$ controls the switch 230, and the trigger signal $S_T$ is further coupled to control the switch 235 via the inverter 262. The flip-flop 285 will generate the control signal $S_W$ in response to the enable signal $S_E$. The comparator 280 has a threshold $V_{TH}$ that is coupled to compare with the voltage on the capacitor 250. The NAND gate 263 is connected to reset the flip-flop 285 according to the output of the comparator 280 and the trigger signal $S_T$ via the inverter 262. Therefore, the flip-flop 285 will be reset to turn off the control signal $S_W$ when the trigger signal $S_T$ is off and the voltage of the capacitor 250 reach the level of the threshold $V_{TH}$.

Before the trigger signal $S_T$ turns on the switch 230 for charging the capacitor 250, the trigger signal $S_T$ will couple to discharge the capacitor 250 through the one-short pulse generator 271 and the transistor 272. If the protection signal $S_B$ is enabled when the trigger signal $S_T$ turns on the switch 230 for charging the capacitor 250, then the trigger signal $S_T$ and the protection signal $S_B$ will couple to discharge the capacitor 250 through the AND gate 261, the one-short pulse generator 273 and the transistor 274. The pulse width of the one-shot pulse generator 273 is longer then the pulse width of the one-shot pulse generator 271. Therefore, the pulse width of the control signal $S_W$ will be shorten once the protection signal $S_B$ is enabled, which will protect the turn-on of the transistor 30 properly.

Figure 5:
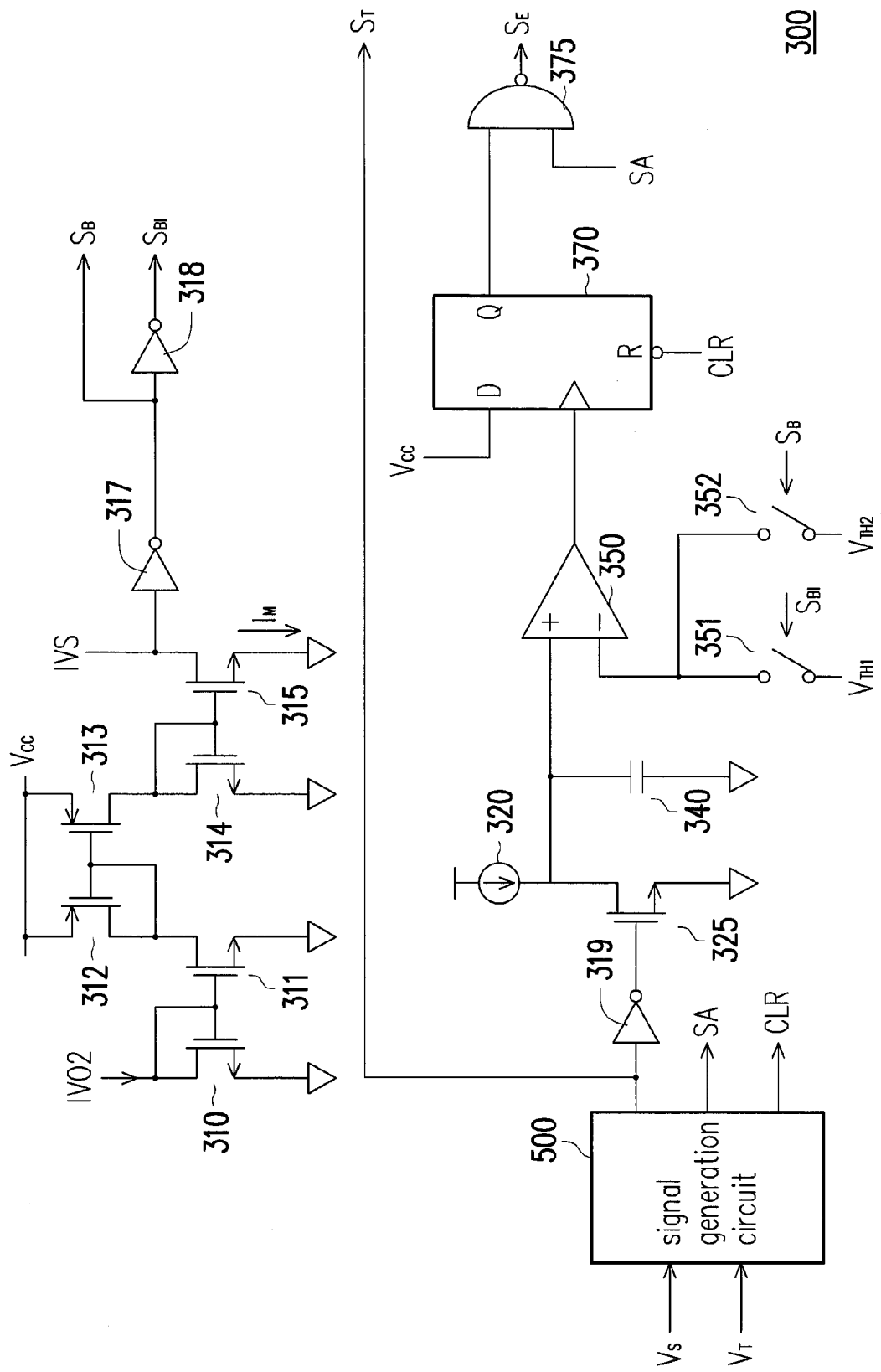
FIG. 5 shows a circuit diagram illustrating the detection circuit according to an embodiment of the present invention.

FIG. 5 shows a circuit diagram illustrating the detection circuit according to an embodiment of the present invention. The detection circuit 300 includes transistors 310-315 and 325, an inverters 317-319, a current source 320, a capacitor 340, a comparator 350, switches 351 and 352, a flip-flop 370, an AND gate 375, and a signal generation circuit 500. The transistors 310, 311, 312, 313, 314 and 315 develop a current mirror circuit for generating a mirror current $I_M$ that is correlated to the "$2 \times V_O$". The current signal $I_{VS}$ compares with the mirror current $I_M$ will generate the protection signal SB through the inverter 317. The protection signal $S_B$ will be enabled to protect the synchronous rectifier operated correctly when the equation (3) cannot be met. The signal generation circuit 500 generates the trigger signal $S_T$, the valid signal $S_A$ and a clear signal CLR in response to the signal $V_S$ and the threshold $V_T$. The inverter 319, the current source 320, the transistor 325 and the capacitor 340 form a period-to-voltage converter to convert the period of the trigger signal $S_T$ to a voltage signal coupled to the comparator 350. The comparator 350 has thresholds $V_{TH1}$ and $V_{TH2}$ controlled by the switches 351 and 352 respectively. The protection signal $S_B$ controls the switch 352. The protection signal $S_B$ is coupled to control the switch 351 via the inverter 318. When the voltage of the capacitor 340 is higher than threshold ($V_{TH1}$ or $V_{TH2}$), the comparator 350 will coupled to enable the flip-flop 370. The output of the flip-flop 370 and the valid signal $S_A$ are connected to the AND gate 375 for generating the enable signal $S_E$. The level of the threshold $V_{TH2}$ is higher than the level of the threshold $V_{TH1}$. Thus, the generation of the enable signal $S_E$ will require a longer period of trigger signal $S_T$ when the protection signal $S_B$ is generated. It means if the input voltage $V_{IN}$ is low and "$V_D < 2 \times V_O$", then a wider switching signal $S_{PWM}$ will be required to enable of the control signal $S_W$.

Figure 6:
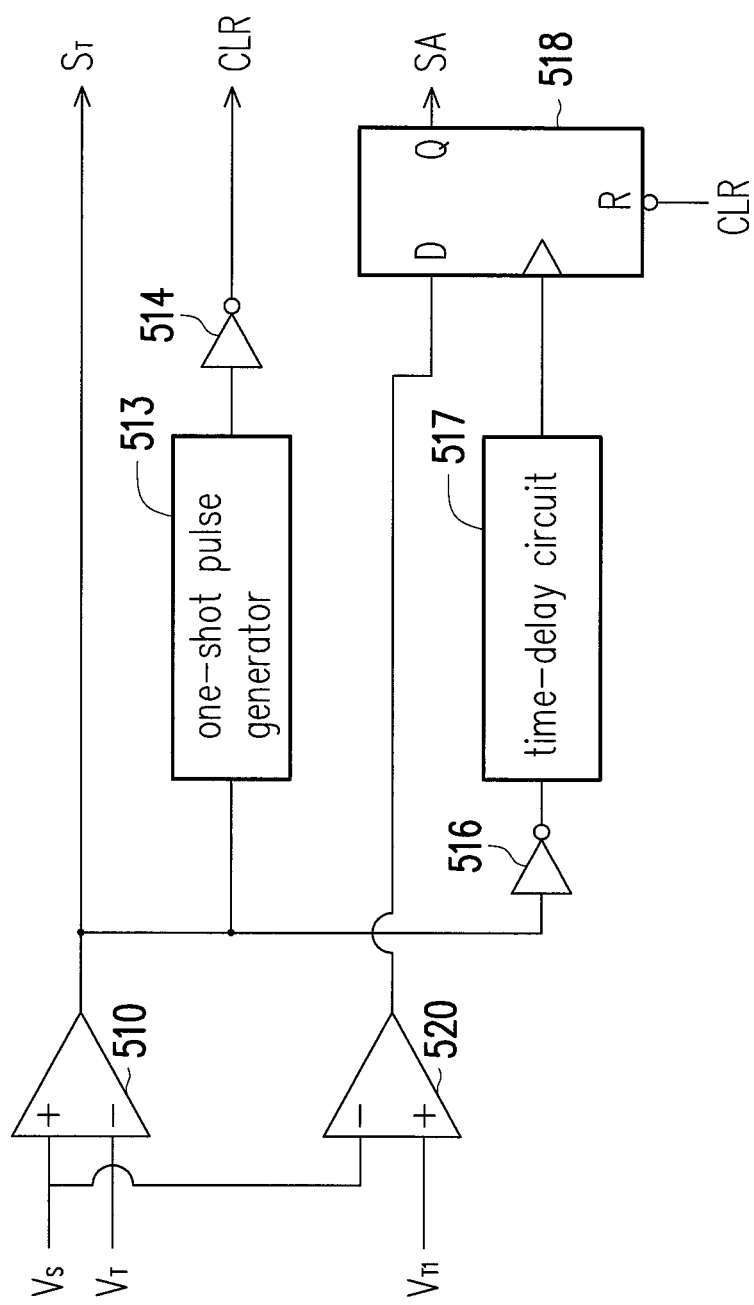
FIG. 6 shows a circuit diagram illustrating the signal generation circuit 500 according to an embodiment of the present invention.

FIG. 6 shows a circuit diagram illustrating the signal generation circuit 500 according to an embodiment of the present invention. The signal generation circuit 500 includes comparators 510 and 520, a one-shot pulse generator 513, inverter 514 and 516, a time-delay circuit 517, and a flip-flop 518. The comparator 510 will generate the trigger signal $S_T$ when the signal $V_S$ is higher than the threshold $V_T$. The trigger signal $V_T$ will generate the clear signal CLR through the one-shot pulse generator 513 and the inverter 514. The comparator 520 will generate a turn-on-enable signal when the signal $V_S$ is lower than a threshold $V_{T1}$ (such as 0V). The turn-on-enable signal is coupled to the D-input of the flip-flop 518. The clear signal CLR is coupled to reset the flip-flop 518. The trigger signal $S_T$ is coupled to clock the flip-flop through the inverter 516 and the time-delay circuit 517 for generating the valid signal $S_A$. The time-delay circuit 517 will generate a trigger-delay signal after the trigger signal $S_T$ is generated. Therefore, the valid signal $S_A$ can be enabled to generate the control signal $S_W$ only when the signal $V_S$ is lower than the threshold $V_{T1}$ before the trigger-delay signal is generated.

Figure 7:
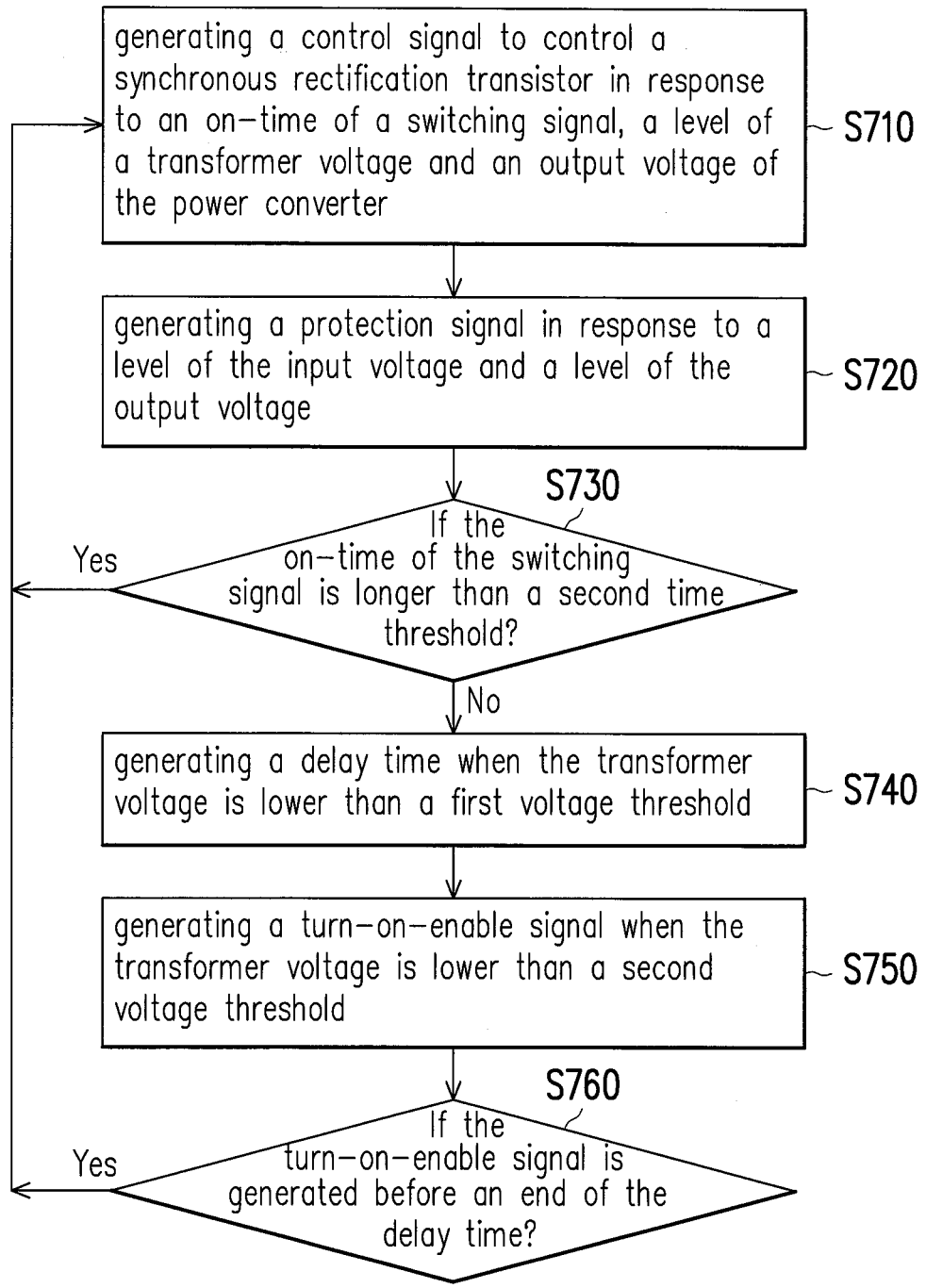
FIG. 7 shows a flow chart showing a method for controlling a synchronous rectifier of a power converter according to an embodiment of the present invention.

FIG. 7 shows a flow chart showing a method for controlling a synchronous rectifier of a power converter according to an embodiment of the present invention. In the present embodiment, the method of FIG. 7 could be implemented by the power converter 10 of FIG. 1, but the present invention is not limited thereto. In step S710, the power converter 10 may generate a control signal to control a synchronous rectification transistor in response to an on-time of a switching signal, a level of a transformer voltage and an output voltage of the power converter 10. In step S720, a protection signal is generated in response to a level of the input voltage and a level of the output voltage. In step S730, if the on-time of the switching signal is longer than a second time threshold the flow return to step S710; otherwise the flow proceeds to step S740. In step S740, a delay time is generated when the transformer voltage is lower than a first voltage threshold. In step S750, a turn-on-enable signal is generated when the transformer voltage is lower than a second voltage threshold. In step S760, if the turn-on-enable signal is generated before an end of the delay time, the flow return to step S710.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for controlling a synchronous rectifier of a power converter, comprising:
generating a control signal to control a synchronous rectification transistor in response to an on-time of a switching signal, a level of a transformer voltage and an output voltage of the power converter,
wherein the switching signal is used for switching a transformer; the control signal is generated once the switching signal is turned off; a transformer signal is related to an input voltage of the power converter; the control signal is generated when the on-time of the switching signal is longer than a first time threshold; and
generating a protection signal in response to a level of the input voltage and a level of the output voltage,
wherein the control signal is generated when the on-time of the switching signal is longer than a second time threshold if the protection signal is generated; the second time threshold is longer than the first time threshold.

2. The method as claimed in claim 1, wherein the protection signal is generated when the input voltage is lower than an under voltage threshold.

3. The method as claimed in claim 1, wherein the control signal is shorten in response to an enablement of the protection signal.

4. The method as claimed in claim 1, further comprising:
generating a delay time when the transformer voltage is lower than a first voltage threshold; and
generating a turn-on-enable signal when the transformer voltage is lower than a second voltage threshold,
wherein the control signal is generated when the turn-on-enable signal is generated before an end of the delay time.

5. A method for the controlling a synchronous rectifier of a power converter, comprising:
generating a control signal to control a synchronous rectification transistor according to a switching signal;
shortening the control signal when an input voltage of the power converter is lower than a low-voltage threshold,
wherein the low-voltage threshold is related to an output voltage of the power converter; the switching signal is used for switching a transformer; the control signal is generated once the switching signal is turned off; the control signal is generated when the on-time of the switching signal is longer than a first time threshold.

6. The method as claimed in claim 5, further comprising:
generating a delay time when a transformer voltage is lower than a first voltage threshold; and generating a turn-on-enable signal when the transformer voltage is lower than a second voltage threshold, wherein the transformer voltage is generated in response to the switching signal is enabled for switching the transformer, wherein the control signal can be generated when the turn-on-enable signal is generated before an end of the delay time.

7. A control circuit for controlling a synchronous rectifier of a power converter, comprising:
   a controller, generating a control signal to control a synchronous rectification transistor in response to a on-time of a switching signal, a transformer voltage and an output voltage of the power converter; and
   a protection circuit, generating a protection signal in response to the transformer voltage and the output voltage;
   wherein the switching signal is used for switching a transformer; the control signal is generated once the switching signal is turned off; the transformer signal is related to an input voltage of the power converter; the control signal is generated when an on-time of the switching signal is longer than a first time threshold; the control signal can be generated when the on-time of the switching signal is longer than a second time threshold if the protection signal is generated; the second time threshold is longer than the first time threshold.

8. The control circuit as claimed in claim 7, wherein the protection signal is generated when the input voltage is lower than an under voltage threshold.

9. The control circuit as claimed in claim 7, wherein the control signal is shorten in response to an enablement of the protection signal.

10. The control circuit as claimed in claim 7, further comprising:
   a delay circuit, generating a delay time when the transformer voltage is lower than a first voltage threshold; and
   a comparator, generating a turn-on-enable signal when the transformer voltage is lower than a second voltage threshold,
   wherein the control signal is generated when the turn-on-enable signal is generated before an end of the delay time.

\* \* \* \* \*